Nov. 10, 1936.          T. R. CAMPBELL                2,060,174
                          PULLEY BLOCK
                       Filed July 9, 1934          2 Sheets-Sheet 1
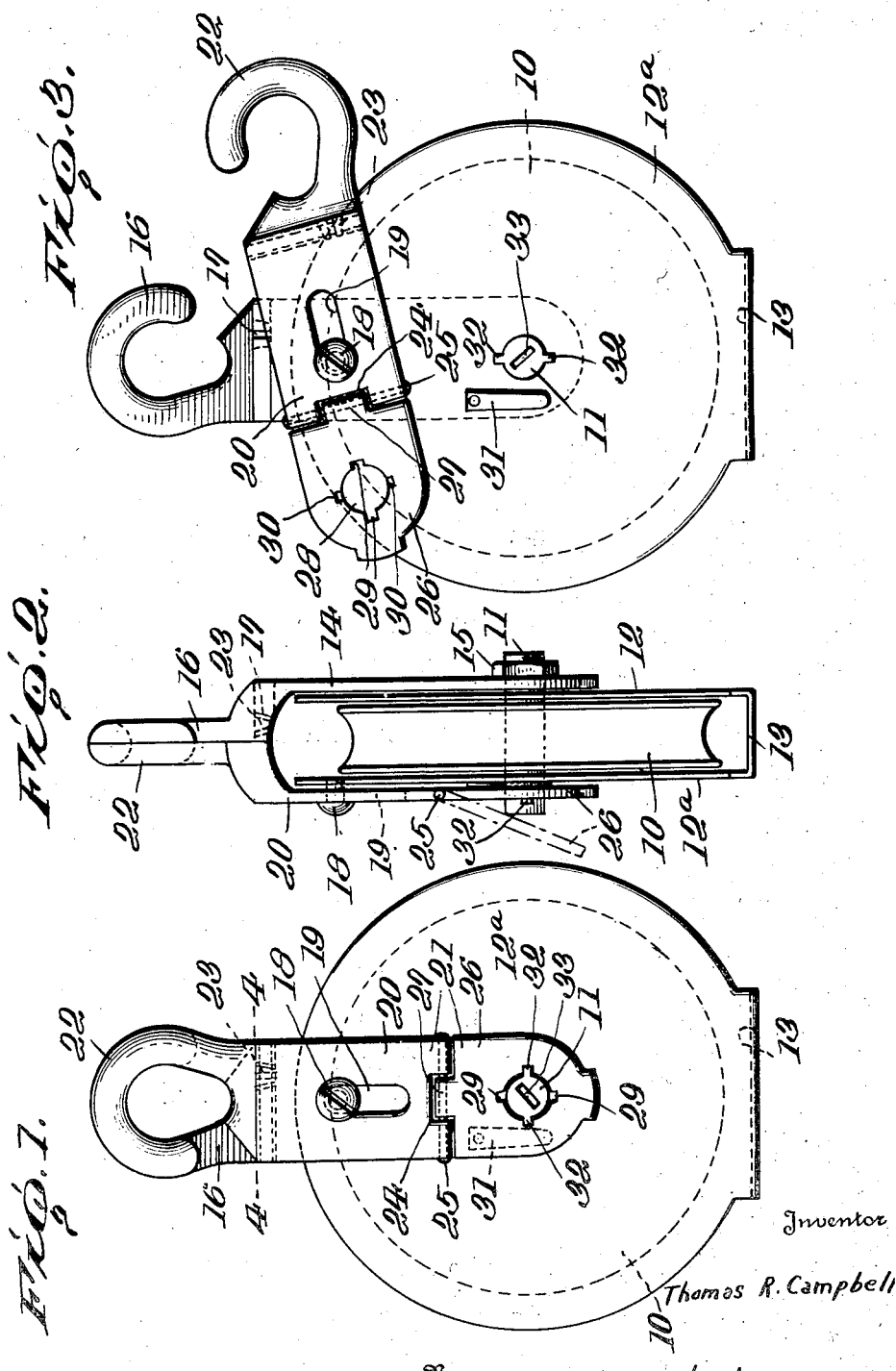
Inventor
Thomas R. Campbell
By Sturtevant & Mason
Attorneys Nov. 10, 1936.  T. R. CAMPBELL  2,060,174
PULLEY BLOCK
Filed July 9, 1934  2 Sheets—Sheet 2
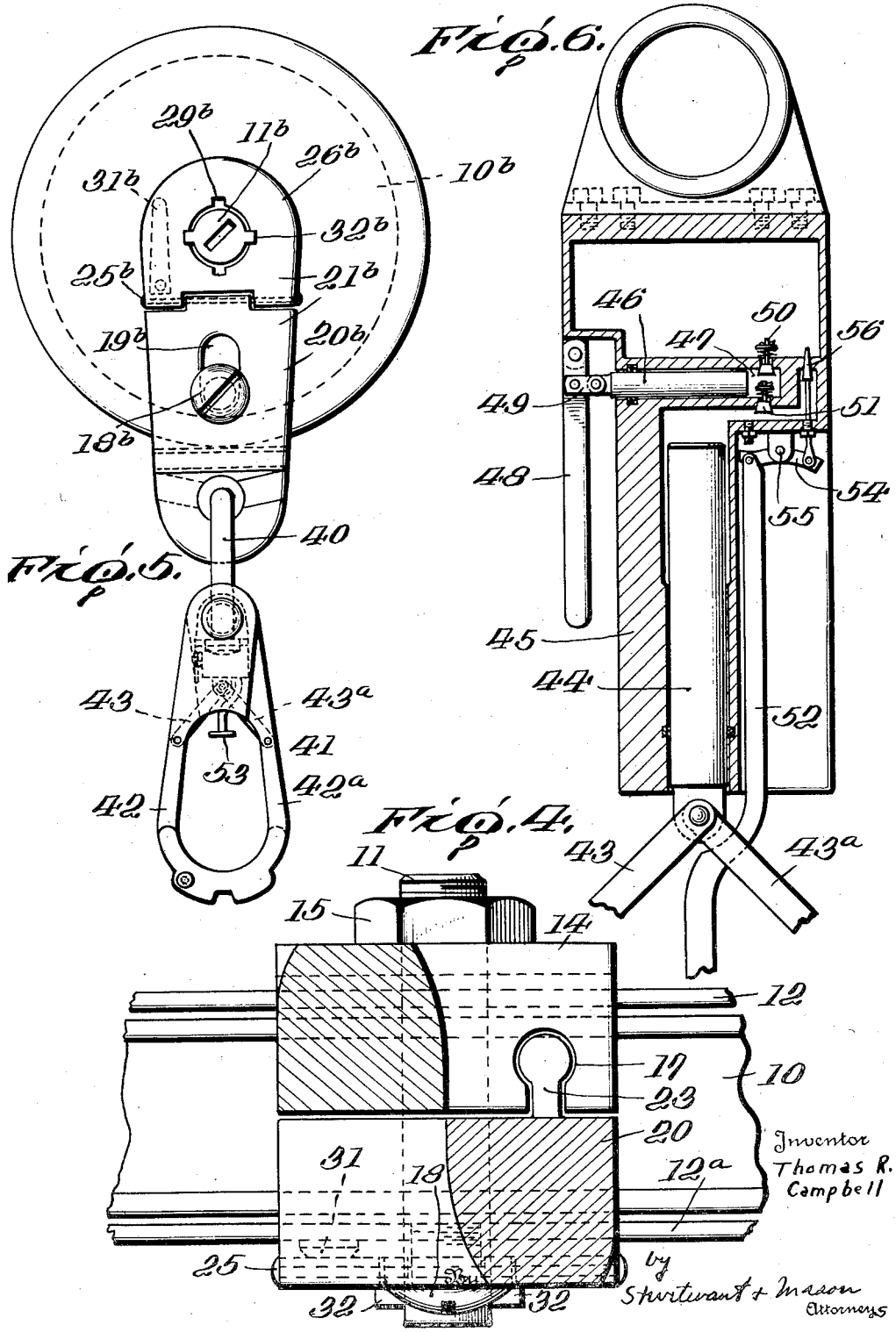

Patented Nov. 10, 1936

2,060,174

UNITED STATES PATENT OFFICE 2,060,174

PULLEY BLOCK

Thomas R. Campbell, Okmulgee, Okla.

Application July 9, 1934, Serial No. 734,399

18 Claims. (Cl. 254—194)

The present invention relates to new and useful improvements in pulley blocks, and more particularly to an improved pulley block which may be quickly shifted from one anchorage to another and which is constructed in a manner to permit a quick change of rope or cable without removing the block from its anchorage.

An object of the present invention is to provide an improved pulley block, of the type referred to, wherein a sheave is supported between two side members which may be positively locked together and wherein one of the side members may be shifted bodily with respect to the other side member to unlock the same and may then be rotated relative to said other side member to permit a quick change of rope or cable or to permit the block to be moved to another anchorage.

A further object of the invention is to provide an improved pulley block, of the type referred to, wherein a sheave is supported between two side members having hooked ends and wherein means are provided for positively locking said side members together and wherein one of said side members may be shifted longitudinally of the other side member to unlock the same and may then be rotated relative to the said other side member to permit a change of cable or to permit the block to be shifted to another anchorage.

A further object of the invention is to provide a pulley block, of the type referred to, wherein a sheave is mounted within a casing and wherein two side members are mounted on the outside of said casing, one of said side members being mounted for longitudinal movement and for rotation relative to the other side member for the purpose described.

A further object of the invention is to provide an improved pulley block, of the type referred to, having a fluid pressure operated hook device associated therewith.

The above and other objects of the invention will in part be obvious and will be hereinafter more fully described.

In the drawings:

Figure 1 is a side view of the pulley block.

Fig. 2 is an end view of the same.

Fig. 3 is a side view showing the position of the movable side member for changing the rope or cable or for changing the anchorage of the block.

Fig. 4 is an enlarged sectional view taken along line 4—4 of Fig. 1.

Fig. 5 is a view showing the fluid pressure operated hook associated with the block.

Fig. 6 is a detail view of the fluid pressure operating device.

Referring more in detail to the accompanying drawings and particularly at this time to Figs. 1–4, a sheave or grooved roller 10 is mounted on an axle 11 which is supported in the sides 12, 12ª of a casing 13. A side or strap member 14 is mounted on the axle 11 outside of the side 12 of the casing and is held in place by a nut 15 which engages the threaded end of the axle. The side member 14 is provided with an inwardly offset hooked end portion 16 above the sheave 10. The offset portion of the strap member 14 is provided with a cut out portion 17, the purpose of which will be hereinafter more fully described. A headed screw 18 or pin is secured to the side 12ª of the casing and extends through a slot 19 in the portion 20 of a movable strap member 21. The portion 20 of the member 21 is also provided with an inwardly offset hooked end portion 22 which registers with the hooked end 16 of the strap member 14. The offset portion of the strap member 21 is provided with an outwardly extending portion 23 which is adapted to fit in the cut out portion 17 on the member 14 so that the two members may be positively interlocked together. The lower end of the portion 20 of the movable strap member is provided with a cut out portion 24 through which extends a pin 25. A locking plate 26 is provided with a protruding portion 27 which is adapted to extend into the cut out portion 24 and to engage the pin 25 whereby it is hingedly connected to the portion 20 and thus forms a part of the movable strap member 21. The locking plate 26 is provided with an opening 28 around the periphery of which are two diametrically opposed cut out portions 29 and two diametrically opposed recesses 30 in the plate.

Adjacent the axle 11 and within the confines of the plate 26, when in the locked position of Fig. 1, there is a leaf spring 31 secured to the side 12ª of the casing. The end of the axle which extends through the side 12ª of the casing is provided with outwardly extending diametrically opposed lugs 32 and a handle portion 33.

The operation of the device will now be described. In the position shown in Fig. 1, the pulley block is in an operative position with the various parts locked, that is, the portion 23 on the strap member 21 is fitted within the slot 17 in the strap member 14 and the hinged plate 26 is flush against the side 12ª of the casing with the end of the axle 11 extending through the opening 28. In this position, the lugs 32 have been turned to rest in the recesses 30 in the plate 26 and the spring 31 forces the same outwardly whereby to insure a tight lock. When it is desired to change the rope or cable without removing the block from its anchorage or when it is desired to shift the anchorage, the plate 26 is pressed inwardly against the action of the spring 31, and the axle 11 is turned so that the lugs 32 register with the cut out portions or slots 29 in which position the plate 26 may be swung outwardly to the position shown in dotted lines in Fig. 2 in order to release the strap member 21.

The entire member 21 may then be raised longitudinally of the opposite strap member 14. This movement of the strap member is permitted by the slot 19 in the portion 20 thereof and when so raised the protruding lug 23 on the strap member will be raised out of the slot 17 in the strap member 14 so as to release this positive locking of the members. When the strap member 21 is in a raised position, it may be swung about the pin 18 as an axis to the position shown in Fig. 3, wherein the rope or cable may be changed or the block may be removed to another anchorage. To again lock the various parts, the procedure is reversed.

In Fig. 5 the same general type of block is shown in combination with a depending fluid pressure operated hook device. In this form, the sheave 10$^b$ is mounted between the sides of the casing and the strap members extend downwardly. The strap member 21$^b$ is of practically the same construction in that it consists of a portion 20$^b$ having a slot 19$^b$ through which a headed pin 18$^b$ extends and a plate 26$^b$ hinged thereto by the pin 25$^b$. The device for locking the plate 26$^b$ is identical with that shown in Figs. 1–3. This particular type of travelling pulley is well adapted for work in oil fields for raising and lowering casings and the like. The two strap members cooperate to hold a link 40 which, in turn, supports a depending hook device 41 having two cooperating pivoted grapple members 42, 42$^a$. In Fig. 6 there is shown in detail the hydraulic pump for operating the grapple members 42, 42$^a$ which are connected by pivoted levers 43, 43$^a$ to the plunger 44 operating in a casing 45. A pump piston 46 is operated within a chamber 47 by a hand lever 48 which is pivoted to the supporting member and connected to the piston by links 49. Reciprocation of the piston 46 by the lever 48 causes air or other fluid means to enter the intake valve 50 and then pass through the outlet valve 51 to the plunger chamber whereby to depress the plunger and to thus spread the grapple members 42, 42$^a$ by the action of the levers 43, 43$^a$. Thus when the grapple members are spread apart, the entire device may be lowered into position to receive the load to be lifted. An arm 52 having a contact portion 53 is mounted on the casing and is connected to a lever 54 pivotally mounted on a bracket 55 which is secured to the casing. The opposite end of the lever 54 is connected to a release valve 56. Thus, when the device is in position to grasp the load, the portion 53 of the arm 52 will contact with the load and in so doing will release the valve 56 whereby the weight of the grapple members will cause them to close thus forcing the plunger 44 upwardly. In this manner, the load may be grasped and lifted.

It will be obvious that when it is desired to remove the hook or grapple device 41, the axle 11$^b$ may be turned to permit the lugs 32$^b$ to register with the slots 29$^b$ so that the strap member 21$^b$ may be moved in a manner similar to that hereinbefore described to permit the link 40 and hook device 41 to be removed.

It is to be clearly understood that minor changes in the details of construction and arrangement of parts may be made without departing from the scope of the invention as set forth in the appended claims.

Having thus fully described my invention, what I claim as new and desire to secure by Letters Patent, is:

1. A pulley block comprising a sheave, an axle therefor, two strap members, one of said strap members being mounted on said axle, independent means for mounting the other strap member for movement in two directions relative to said first strap member to permit a quick change of rope, and means for positively locking said strap members together.

2. A pulley block comprising a sheave, an axle therefor, a one-piece strap member mounted on said axle, a two-part strap member, means for mounting said two-part strap member for movement longitudinally and radially of said one-piece member, and means for locking said strap members in operative position.

3. A pulley block comprising a sheave, an axle therefor, a one-piece strap member mounted on said axle, said strap member having an inwardly offset hooked end portion provided with a recess therein, a two-piece strap member having an inwardly offset hooked end portion cooperating with the hooked end portion of said one-piece strap member, said two-piece strap member having a projection adapted to fit into the recess in said one-piece strap member whereby to positively lock the same together, means for mounting said two-piece strap member for movement longitudinally of said one-piece strap member to release the lock and for movement radially of said one-piece strap member to permit a quick change of rope.

4. A pulley block comprising a sheave, an axle therefor, a one-piece strap member mounted on said axle, a two-part strap member including a hinged plate, means for mounting said two-part strap member for movement longitudinally and radially of said one-piece strap member, means for locking said strap members against relative rotation, and means including said hinged plate for locking said strap members against relative longitudinal movement.

5. A pulley block comprising a sheave, an axle therefor, a one-piece strap member mounted on said axle, a two-part strap member including a hinged plate, means for mounting said two-part strap member for longitudinal and radial movement relative to said one-piece strap member, said hinged plate having an opening with diametrically opposed slots communicating therewith, and diametrically opposed lugs on one end of said axle adapted to extend through the slots in said plate, said axle being adapted to be turned to permit said lugs to overlie the face of said plate whereby to lock the same.

6. A pulley block comprising a casing having parallel sides, an axle mounted in the sides of said casing, a sheave mounted on said axle between the sides of said casing, a strap member mounted on one end of said axle adjacent one side of said casing, a pin mounted in the opposite side of said casing, a second strap member having a slot through which said pin extends whereby to support said member, said slot permitting longitudinal movement of said second strap member and said pin serving as an axis for permitting rotation of said member, and means for locking said strap members against relative movement.

7. A pulley block comprising a casing having parallel sides, an axle mounted in the sides of said casing, a sheave mounted on said axle between the sides of said casing, a one-piece strap member mounted on said axle adjacent one side of said casing, a two-part strap member including a hinged plate, means for mounting said two-part strap member on the opposite side of said casing, said two-part strap member being movable relative to said one-piece strap member to permit a quick change of rope or cable, and means including said hinged plate for locking said strap members together.

8. A pulley block comprising a pair of strap members, an axle carried by one of said strap members, a sheave mounted on said axle, independent means for mounting the other of said strap members for movement relative to said first strap member, and means including a hinged locking plate associated with said movable strap member and cooperating with said axle for locking said strap members together.

9. A pulley block comprising a pair of strap members, an axle carried by one of said strap members, a sheave mounted on said axle, independent means including a pin and slot connection for mounting the other of said strap members for movement relative to said first strap member, and means including a hinged locking plate associated with said movable strap member and cooperating with said axle for locking said strap members together.

10. A pulley block comprising a casing, an axle passing through the sides of said casing, a sheave mounted on said axle, a pair of strap members having cooperating hooked ends, one of said strap members being mounted on said axle, means for mounting the other of said strap members on said casing for movement relative to said first strap member, and releasable means for locking said strap members in a fixed position relative to one another.

11. A pulley block comprising a casing, an axle mounted in the sides of said casing, a sheave mounted on said axle, a pair of strap members having cooperating hooked ends, one of said strap members being mounted on said axle, a headed pin on the opposite side of said casing, a slot in said other strap member, said pin extending through said slot whereby to support said strap member, and releasable means including a hinged locking plate for securing said strap members in a fixed relative position.

12. A pulley block comprising a casing, an axle mounted in the sides of said casing, a sheave mounted on said axle between the sides of said casing, a fixed strap member mounted on said axle, a movable strap member mounted on the opposite side of said casing, a locking plate hingedly mounted on said movable strap member and having a pair of diametrically opposed slots therethrough and a pair of diametrically opposed recesses on one face therof, and a pair of diametrically opposed projections on the end of said axle, said projections being adapted to pass through the slots in said plate and to be turned to rest in the recesses in said plate whereby to lock said movable strap member.

13. A pulley block comprising a casing, an axle mounted in the sides of said casing, a sheave mounted on said axle between the sides of said casing, a fixed strap member mounted on said axle, a movable strap member mounted on the opposite side of said casing, a locking plate hingedly mounted on said movable strap member and having a pair of diametrically opposed slots therethrough and a pair of diametrically opposed recesses on one face thereof, a pair of diametrically opposed projections on the end of said axle, said projections being adapted to pass through the slots in said plate and to be turned to rest in the recesses in said plate whereby to lock said movable strap member, and a spring for urging said plate outwardly whereby to prevent turning of the axle when said projections are in said recesses.

14. A pulley block comprising an axle, a sheave carried thereby, a member through which said axle extends, said member having a hooked end disposed at a fixed distance from said axle, a movable strap having a hooked end cooperating with the hooked end on said member, and means for mounting said movable strap independently of said axle for movement relative to said member while remaining parallel to the side of said casing.

15. A pulley block comprising a casing, an axle mounted in said casing, a sheave carried by said axle, means for providing cooperating interlocking hook members for supporting said casing, said means including a movable strap member mounted on said casing for independent movement relative to said axle, and means including a spring member for holding said movable strap member in a fixed locked position relative to said axle while remaining parallel to the side of said casing.

16. A pulley block comprising an axle, a sheave carried thereby, means for providing a member having a hooked end located at a fixed distance from said axle, means for providing a strap having a cooperating hooked end, means for mounting said strap independently of said axle for movement in a plurality of directions relative to said member while remaining parallel thereto, and means for locking said strap in a fixed position relative to said member.

17. A pulley block comprising a sheave, an axle therefor, a pair of side members mounted for movement parallel to one another and to said sheave, said side members having inwardly offset shoulders and cooperating hooks above said shoulders, and cooperating locking means on said shoulders for maintaining said side members and hooks in operative position.

18. A pulley block comprising a sheave, an axle therefor, a pair of side members mounted for movement parallel to one another and to said sheave, said side members having inwardly offset shoulders and cooperating hooks above said shoulders, one of said shoulders having a recess therein, and a projecting portion on the other of said shoulders adapted to fit in said recess whereby to maintain said side members and hooks in operative position.

THOMAS R. CAMPBELL.